(12) United States Patent
Naresh et al.

(10) Patent No.: US 8,655,910 B1
(45) Date of Patent: Feb. 18, 2014

(54) METHODS AND SYSTEMS FOR COUPLING CLIENT-SIDE AND SERVER-SIDE PERSISTENCE FRAMEWORKS

(75) Inventors: Rakshith Naresh, Bangalore (IN); Rupesh Kumar, Kamataka (IN)

(73) Assignee: Adobe Systems Incorporated, San Jose, CA (US)

(*) Notice: Subject to any disclaimer, the term of this patent is extended or adjusted under 35 U.S.C. 154(b) by 563 days.

(21) Appl. No.: 12/607,391

(22) Filed: Oct. 28, 2009

(51) Int. Cl.
G06F 7/00 (2006.01)
G06F 17/30 (2006.01)

(52) U.S. Cl.
USPC .......................................................... 707/770

(58) Field of Classification Search
USPC .................... 707/802, 803, 809, 812, 770
See application file for complete search history.

(56) References Cited

U.S. PATENT DOCUMENTS

| | | | |
|---|---|---|---|
| 6,163,776 A * | 12/2000 | Periwal | 1/1 |
| 6,473,794 B1 * | 10/2002 | Guheen et al. | 709/223 |
| 6,609,123 B1 * | 8/2003 | Cazemier et al. | 1/1 |
| 7,702,649 B1 * | 4/2010 | Bresch et al. | 707/999.104 |
| 2006/0235871 A1 * | 10/2006 | Trainor et al. | 707/102 |
| 2007/0130180 A1 * | 6/2007 | Rasmussen | 707/100 |
| 2007/0174428 A1 * | 7/2007 | Lev Ran et al. | 709/218 |
| 2007/0245311 A1 * | 10/2007 | Bumgarner et al. | 717/120 |
| 2009/0055410 A1 * | 2/2009 | Colgrave et al. | 707/100 |
| 2009/0240869 A1 * | 9/2009 | O'Krafka et al. | 711/103 |
| 2010/0179940 A1 * | 7/2010 | Gilder et al. | 707/622 |

OTHER PUBLICATIONS

"What is [a] Persistence Framework?," available at http://www.roseindia.net/enterprise/persistenceframework.shtml, copyright 2007 (last accessed Oct. 28, 2009).

* cited by examiner

*Primary Examiner* — Wilson Lee
*Assistant Examiner* — Mark E Hershley
(74) *Attorney, Agent, or Firm* — Kilpatrick Townsend & Stockton LLP (57) ABSTRACT

A client application can be configured to use a client-side persistence framework to maintain a local database for use in storing data even when a data provider is not available. In accordance with the present subject matter, the client application can be configured to obtain and rely on server-side persistence metadata rather than requiring the persistence metadata to be specifically included in the code for the client-side application. In some instances, this can simplify the development process and/or allow for more robust client-side applications.

18 Claims, 4 Drawing Sheets

METHODS AND SYSTEMS FOR COUPLING CLIENT-SIDE AND SERVER-SIDE PERSISTENCE FRAMEWORKS

TECHNICAL FIELD

The disclosure below generally relates to software development, particularly to client-server architectures.

BACKGROUND

Network-based applications can utilize a local client application that interfaces with one or more remote data providers to obtain data of interest. As an example, a remote data provider may comprise an application server, such as Adobe(R) ColdFusion(R), available from Adobe Systems Incorporated of San Jose Calif. The data provider can utilize application logic that defines how the data provider responds to queries. For example, for a ColdFusion(R) server, a CFML code file can define logic for accessing data from a database or other resource and packaging the data into logical units, such as software objects, that can be used to return data to the client application.

A persistence framework can comprise software components that bridge the gap between the representation of the data as logical units as handled by the data provider (e.g., as software objects in memory) and representation of the underlying data in a database. For example, the persistence framework can rely on persistence metadata to construct database queries (e.g., SQL queries) and to associate data returned in response to queries with respective parameters of the logical units (e.g., object parameters). The persistence framework may represent components or processes included in the application server or may represent a separate component invoked by the application server.

SUMMARY

A client application can be configured to use a client-side persistence framework to maintain a local database for use in storing data even when a data provider is not available. In accordance with the present subject matter, the client application can be configured to obtain and rely on server-side persistence metadata rather than requiring the persistence metadata to be specifically included in the code for the client-side application. In some instances, this can simplify the development process and/or allow for more robust client-side applications.

Embodiments include a method comprising requesting, by a client application executed using a processor, object data from a remote data provider, receiving object data from the remote data provider, and maintaining the object data in memory accessible by the processor. For example, maintaining the object data may comprise storing an object in volatile memory, such as working memory in RAM and/or cache memory accessible by the processor. The remote data provider may be an application server reachable by a network connection or another application separate from the requesting application and configured to respond to requests.

The method includes receiving persistence metadata associated with the object from the data source and storing the object data in a local database by using the persistence metadata to determine how the object data is to be mapped into one or more database structures. The persistence metadata may be associated with the object in any suitable manner. For example, the object may be an instance of a class, and the persistence metadata can be specified with regard to the class.

In some embodiments, the persistence metadata identifies at least a plurality of parameters of the class. Each object can correspond to a row in a database table associated with the class, with parameter values for the object included in corresponding columns of the table.

In some embodiments, the method includes determining a version of persistence metadata (if any) available prior to providing the request to the data provider. Version data can be provided to the data provider and, in response, the data provider may provide an updated version of the persistence metadata. This can be used at the client to update the local database, such as by adding additional columns to a database table, establishing a new database, and/or otherwise adjusting database structure.

Embodiments also include systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
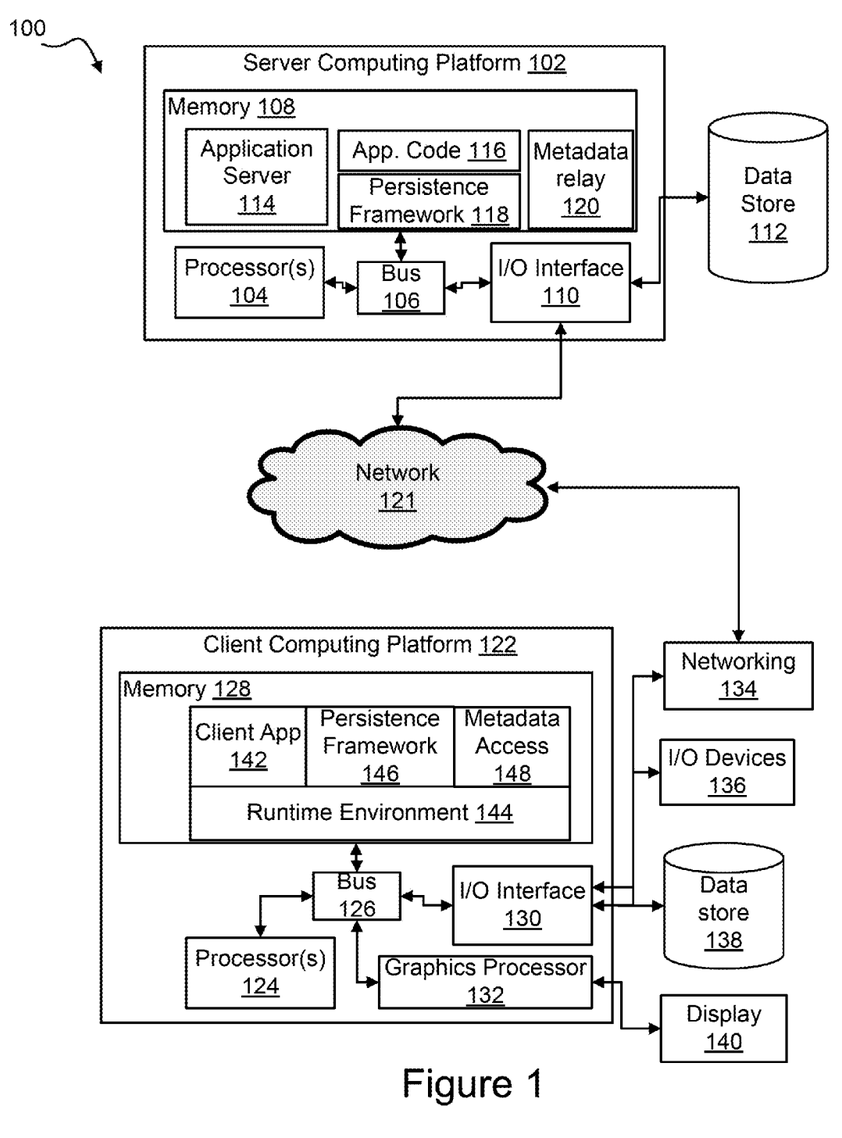
FIG. 1 is a block diagram showing an example system architecture including a client and server that support sharing persistence framework data.

FIG. 1 is a block diagram showing an illustrative system architecture 100 including a server computing platform 102 and a client computing platform 122 configured to support sharing persistence framework data. In this example, a single server and client platform are shown, but in practice more clients could be supported by a single server and/or a given client application may rely on multiple different servers for data.

Server computing platform 102 includes a processor 104 with access via bus 106 to a tangible computer-readable medium 108 which can comprise RAM, ROM, cache, or Flash memory or any other suitable storage medium. Additional components can include input-output (I/O) handling components (e.g., keyboard, mouse, touchscreen) connected via I/O interface 110. A data store 112 is included to represent one or more databases or other sets of records accessible by computing platform 102. For instance, data store 112 may represent an SQL database stored using one or more hard drives included in computing platform 102 and/or accessible via network 121 or another connection. In this example, server computing platform 102 does not include a display or other input components, but such components may be included and/or server computing platform 102 may be controlled via remote login. Server computing platform 102 may additionally include networking components (e.g., Ethernet card, wireless components) to access network 121.

Memory 108 embodies various program components, in this example, an application server 114, application code 116, a persistence framework 118, and a metadata relay module 120. Additional components such as an operating system, other application code files for use by application server 114, and the like may also be included in memory 108.

Application server 114 can comprise one or more program components that configure server computing platform to provide functionality, such as exposing an application programming interface (API) to clients for accessing business logic provided by server platform 102 as configured by one or more program components.

For example, application server 114 may comprise an engine used to generate dynamic content for web pages and/or web applications based on application code 116. Examples of application servers include, but are not limited to, Adobe (R) ColdFusion(R) and Microsoft ASP.net, available from Microsoft Corporation of Redmond Wash. Further examples include Java frameworks and PHP.

In this example, application server 114 is configured to access program logic specified in application code 116. However, embodiments include application servers 114 coded to directly provide business logic without the use of separate application code 116.

Application server 114 delivers data to and/or receives data from one or more client applications 144. In doing so, the application server will configure platform 102 to store data representing an object or other logical unit in memory 108. For instance, application code 116 may define one or more object classes to be populated with data from data store 112 and/or operated on by other application logic defined in code 116. As an example, an application code file 116 may comprise a CFML file specifying a class that is used to instantiate one or more objects at runtime, with the object(s) populated by accessing one or more rows of data from a table in data store 112 and then returned to a requesting client application.

A developer writing or updating a server-side component may wish to utilize the persistence framework 118 in order to avoid the need to include program logic for interfacing directly with data store 112. For instance, if data store 112 comprises an SQL database, in the absence of the persistence framework, the developer would need to include code for providing SQL statements, receiving an array of data returned from the data store, and storing the data in the array as one or more software objects for use by application server 114. Similarly, the code would need to include suitable statements and commands to convert software objects into data for inclusion in datastore 112. Additionally, code for setting up and maintaining database tables, table relationships, and the like would be included.

Persistence framework 119 represents one or more applications, processes, or components that are used to bridge the gap between data as stored in data store 112 and data as handled by application server 114. Examples of persistence frameworks include, but are not limited to, the Hibernate object/relation persistence and query service available online.

Persistence framework 118 can rely on persistence metadata that defines relationships between software objects or other units as handled by application server 114 and data as stored using data store 112. Persistence metadata can comprise, for example, data mapping object parameters to database columns, data identifying a relationship between the object and another object, data identifying join columns for the database, a loading parameter for use in loading data from the database, or a cascading option. The persistence metadata may be entered by a developer when writing code. For instance, if application code 116 comprises a CFML file for use with the ColdFusion(R) server environment, then persistence metadata may be included alongside class definitions and can be recognized by application server 114 based on syntax and/or tags in the code.

FIG. 1 also depicts a client computing platform 122 interfaced with server computing platform 102 via network 121, which may represent a local area network or a wide area network (e.g., the Internet). Client computing platform 122 includes a processor 124 with access via bus 126 to a tangible computer-readable medium 128 which can comprise RAM, ROM, cache, or Flash memory or any other suitable storage medium. Additional components include input-output (I/O) handling components 130 and a graphics processor 132. Client computing platform 122 also includes one or more networking or other interfaces 134 (e.g., Ethernet, USB, etc.), user input (UI) devices 136 (e.g., a mouse, keyboard, touch screen interface, etc.), and a data store 138, which can represent nonvolatile storage devices (e.g., hard disk, optical drive (s)).

Memory 128 embodies various program components, including a client application 144. In this example, client application 142 utilizes a runtime environment 144 to provide desired client-side functionality based on accessing one or more remote data providers including (but not limited to) application server 114. Generally, a runtime environment 144 may be used to allow use of a client application 142 across multiple types of computing platforms, with each platform having a corresponding version of the runtime environment that is adapted to the particular operating system and/or hardware of the computing platform. An example of a suitable runtime environments include, but are not limited to, the AIR(R) environment available from Adobe Systems Incorporated. The present subject matter can be used with stand-alone applications, i.e., applications that can be executed independently of a runtime environment.

Application 142 can comprise suitable program components to provide a user interface, receive input, and otherwise interact with a user (and/or other devices at client platform 122) to determine data to be obtained from and provided to one or more remote data providers. For instance, application 142 may comprise an application that displays employee records and allows for editing of those records, with the records obtained from datastore 112 by making requests from client application 142 to application server 114.

A developer may wish for client application 142 to be used even when access to network 121 and/or server computing platform 102 is not available or desired. In this example, a client-side persistence framework 146 is included in or utilized by application 142/runtime environment 144 in order to facilitate offline functionality by storing local versions of data accessed from remote data providers and generated using client application 142.

For example, one or more software objects or other logical units may be returned by application server 114 in response to a query from client application 142. These objects can be stored in nonvolatile memory 128, such as RAM comprising working memory for application 142. Additionally, persistence framework 146 can be used to define and maintain one or more database tables in data store 138. For example, runtime environment 144 may include database software, such as SQL lite, which can be invoked by suitable commands from persistence framework 146 to locally store and retrieve data representing the object(s) returned by server 114 using the database.

As was noted above, a persistence framework utilizes persistence metadata in order to determine how to store data as handled by an application (e.g., as software objects) in a database (e.g., as entries in one or more database tables). Additionally, the persistence metadata may define what data is stored, relationships between software objects, how data is to be loaded, one or more mappings between fields and columns in the database table based on cascading options that define relationships between objects, and other suitable information.

In order to use persistence framework 146 at client 122, persistence framework 146 will require persistence metadata indicating how client-side data representing objects or other logical units are to be stored in client-side data store 138. A developer can include such information when coding client application 142, but this process may be tedious.

Embodiments configured in accordance with the present subject matter can at least partially reduce this burden by including components that relay persistence metadata already provided for server-side code for use by client-side components. In the example of FIG. 1, metadata access module 148 obtains the persistence metadata from metadata relay module 120 at server computing platform 102.

Metadata access module 148 represents one or more client-side applications, processes, or components that coordinate with server-side components to retrieve persistence metadata from a remote data provider. Access module 148 may be a separate component or may be included in client application 142, persistence framework 146, or runtime environment 144.

Turning to server 102, metadata relay module 120 can comprise one or more applications, processes, or components that configure server 102 to provide persistence metadata to clients. Metadata relay module 120 may be included in application server 114, persistence framework 118, or may comprise a separate component.

In some embodiments, metadata relay module 120 may identify persistence metadata in application code 116 based on syntax and/or context of statements in the code. For example, if application code 116 comprises CFML code for use by ColdFusion(R), the persistence metadata can be recognized based on tags included in the code file and tied to ColdFusion(R) components. As another example, the persistence metadata can be obtained based on querying the application server or persistence framework 118 for a copy of the persistence metadata used to load/store a particular instance of an object or other logical unit.

Figure 2:
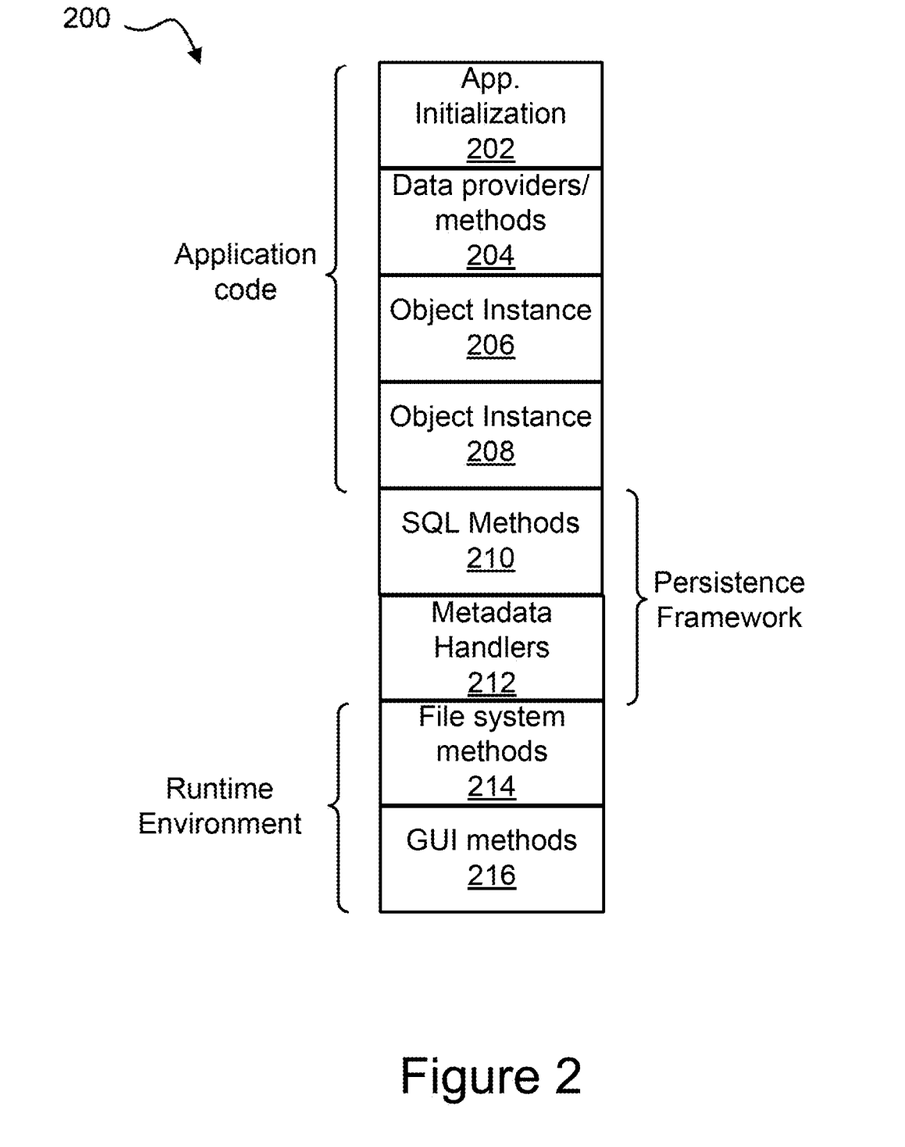
FIG. 2 is a diagram illustrating exemplary components of an application, including a persistence framework including support for sharing persistence metadata.

FIG. 2 is a diagram 200 illustrating exemplary components of an application, including a persistence framework including support for sharing persistence metadata. This example represents exemplary program components of a client application. Program components 202 represent application initialization components to set up variables, invoke operations provided by a runtime environment to initialize memory space, and the like. Program components 204 represent code setting up data providers and other methods (i.e., program logic) to operate on objects.

Program components 206 and 208 represent objects that have been instantiated during operation of the application. Program components 204 may include calls to data providers that return data stored in working memory as object instances 206 and 208 to be operated upon by other program components (e.g., methods of program component 204). For example, methods included in program component 204 may provide for display of a datagrid or other interface element to display data represented by program components 206 and 208 and additional interface elements (e.g., fields, buttons) to control updates to the data.

Program components 210 and 212 have been provided by the persistence framework in this example. For example, code for the application may include a statement indicating that use of the client-side persistence framework is desired. When the application is compiled (or initialized in a runtime environment), components 210 and 212 can be included in the running application. For instance, component 210 represents SQL methods that can be used to take data represented in object instances 206 and 208 and store the data in a local SQL database. As another example, the SQL methods may be used to populate object instances 206 and 208 when a connection to the data provider is not available.

In accordance with the present subject matter, program component 212 comprises one or more metadata handlers. For example, the metadata handlers can comprise code that recognizes persistence metadata corresponding to object instances 206 and 208 returned from the data provider when a connection is available and makes the persistence metadata available to the SQL methods for use in loading/storing data in the client-side database. The metadata handlers may also be used to maintain data indicating a version of persistence metadata and coordinate with the remote data provider to obtain the most-recent version of persistence metadata. In some embodiments, the metadata handlers explicitly request the persistence metadata by setting up an appropriate connection to the server and requesting the metadata; however, a data provider may automatically provide persistence metadata when object data is returned in response to requests by other components (e.g., data providers in program component 204).

FIG. 2 also shows file system methods 214 and GUI methods 216. These program components are included to represent some (but not necessarily all) components that may be built into an application when executed in a runtime environment. If a stand alone application is to be used, then such methods may be included in application code.

Figure 3:
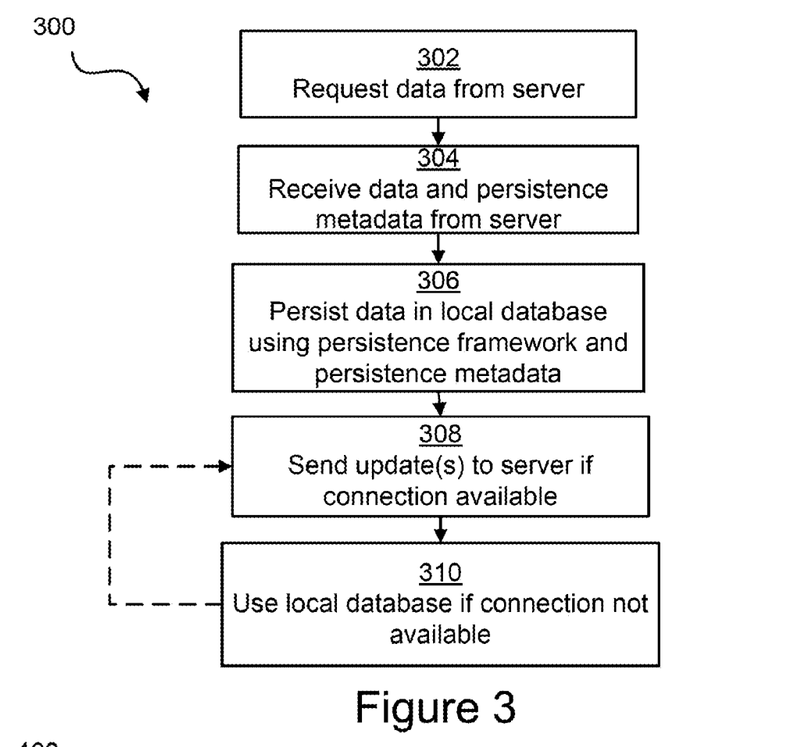
FIG. 3 is a flowchart showing steps in an exemplary client-side method for obtaining and using persistence metadata.

FIG. 3 is a flowchart showing steps in an exemplary client-side method 300 for obtaining and using persistence metadata. Block 302 represents requesting data from a server. For example, a client-side application may include data providers that submit an HTTP GET request or another request to an application server along with one or more parameters identifying desired data. For instance, if the client-side application is to display employee data, the request may specify employee names, identification numbers, or other identifiers for records of interest; as another example, the request may comprise a request for all employee records.

Block 304 represents receiving requested data and persistence metadata from the server. The persistence metadata may be received alongside data returned in response to the data request. For example, the application server may return one or more objects, such as XML objects containing the requested data and then an XML object containing persistence metadata for the object(s). The received object data can be stored in working memory for the application as one or more software objects or other logical units to be operated on by the client application.

Block 306 represents persisting the received data in a local database using a persistence framework and persistence metadata. For example, the persistence framework may include methods and functions that access the locally-stored software objects and provide SQL or other database commands to store object parameter values in database columns corresponding to the parameters.

As an example, an "employee" object may include parameters such as name, ID, and address. The persistence metadata may identify that the name, ID, and address each constitute a separate column in the database, with the ID used as the key. This information can be used to set up one or more database tables (if not set up previously) in the local data store and then to store the employee object therein. Depending on the particular configuration of the client application and the data returned by the server, an object may correspond to one or more database records. For example, an "employee" object may include data regarding a single "employee" record, while an "employees" object may correspond to a plurality of records.

The relationship between the objects may be specified in the persistence metadata and can be used to configure database tables and relationships accordingly. For instance, a table may be used to maintain a record for each of a plurality of "employees" object, each object in the first table cross-referenced to a corresponding table representing a plurality of "employee" objects. As another example, a many-to-one relationship may be defined between an employee record type and a department table—that is, each department may be associated with may employee records but each employee record is associated with one department. "ManyToOne" persistence metadata can define a relationship type, while Join-Column metadata will indicate what column in the employee table holds the reference to the primary key value of the corresponding department for each employee record.

Block 308 represents sending one or more data updates to the server if a connection is available. For example, while the network connection is online, data may be persisted locally and any changes can be immediately uploaded to the server. Block 310 represents using the local database if a connection is not available. For example, if the client application cannot reach the server (e.g., due to lack of connectivity), then employee records may be updated/added, with the changes/additions stored in the local database. The method flows back to block 308 in which the server is updated once connectivity is available again.

The client and server application can be configured to resolve differences in data as is known in the art. For example, routines can be included to alert a user of the client application when a client-side change to a record conflicts with a change to the record in the server-side version and/or to select which side to overwrite.

Figure 4:
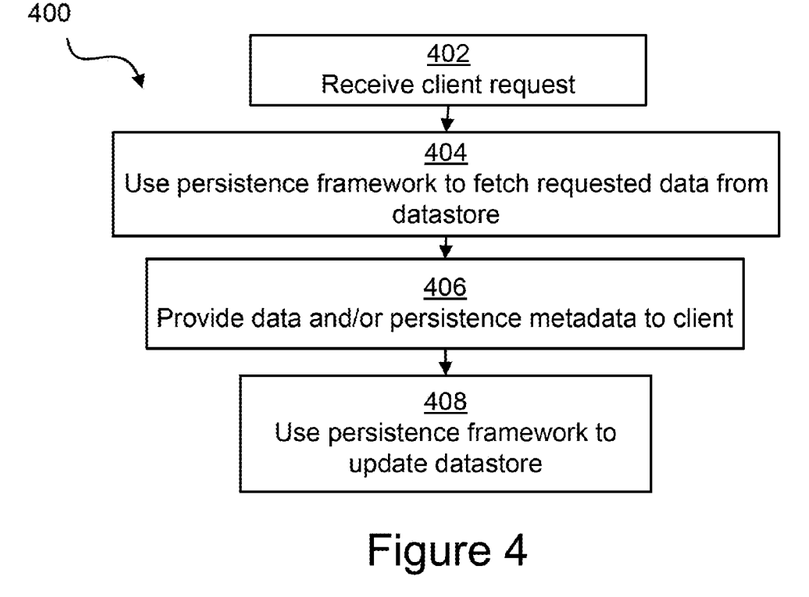
FIG. 4 is a flowchart showing steps in an exemplary server-side method for providing persistence metadata.

FIG. 4 is a flowchart showing steps in an exemplary server-side method 400 for providing persistence metadata. For example, method 400 may be carried out by an application server and related components in response to a request for data from a client application. Block 402 represents receiving the client request. The request may specify a desired object or objects and/or may specify desired persistence metadata. For instance, the request may comprise the HTTP GET request for "employee" data noted in the example above.

Block 404 represents using the server-side persistence framework to fetch the requested data from the datastore. For example, if a ColdFusion(R) application server is configured to provide functionality by a CFML file, the file may define an "Employee" class as a ColdFusion(R) Component (CFC) as noted in the left side of the table below. The corresponding persistence metadata as noted in the right side of the table below:

| Class Definition Alone | Class Definition with Persistence Metadata |
|---|---|
| <cfcomponent"> <cfproperty name= "EmpID"/> <cdproperty name= "EmpName"/> <cfproperty name= "Address"/> </cfcomponent> | <cfcomponent persistent= "true" table = "EMPLOYEE"> <cfproperty name ="EmpID" column="EMP_ID" fieldtype= "ID" /> <cfproperty name = "EmpName" column= "EMP_NAME"/> <cfproperty name = "Address" column= "ADDRESS"> </cfcomponent> |

In this example, the persistence metadata specifies that the "Employee" component is to be stored in a database table named EMPLOYEE. The "EmpID" property is to be stored in a column named EMP_ID that is also the key for the database table (indicated by "fieldtype=ID"). The table also includes columns EMP_NAME and ADDRESS corresponding to the parameters "EmpName" and "Address," respectively. This metadata can be recognized by the persistence framework by use of the "persistent=true" tag in the class definition and "table" and "column" parameters.

When an "Employee" object (or objects) are requested, the persistence metadata can be used to obtain corresponding data specified in terms of the "Employee" component through use of database queries. For example, a request may specify that data is desired for "EmpName=Smith". The persistence framework can use the request data and persistence metadata to query the EMPLOYEE table for "EMP_NAME='Smith'". Other components of the application server can store the data in memory and package it into an appropriate object (e.g., an XML object) to be sent to the client.

Block 406 represents providing the requested data and/or the persistence metadata to the client. For instance, the XML object containing query results can be sent in response to the request noted above. The persistence metadata can be identified based on context in the application code and sent as a separate XML package or other object.

In some embodiments, the server supports version control and block 406 can comprise determining if an updated version of the persistence metadata is needed before sending the metadata. For example, the server may maintain a copy of the persistence metadata for a code file and detect changes in the persistence metadata; each time a change is detected, the server can increment a version number. If the server determines that the client-side version is different from the server-side version (or no client-side version exists, e.g., the client identifies "version 0"), then the current persistence metadata can be sent. As another example, a client may track persistence metadata version information by number, date/time of receipt, or another identifier that can be provided to the server and used by the server to determine if data has been changed since the persistence metadata was provided to the client and to send the latest data if changes have been made. As another example, the client may send client-side persistence metadata for comparison to current persistence metadata by the server.

Block 408 represents using the persistence framework to update the datastore as needed. For example, a client request may specify changes/additions to stored data. Continuing with the "Employee" example above, after editing is complete, the client may return an object to the server, the object including new or changed Employee records. The persistence framework can be used as is known in the art to convert the object as stored in memory into suitable database records. For example, the "EmpName," "EmpID," and "Address" parameter values can be extracted and stored in respective columns of the EMPLOYEE table.

Figure 5:
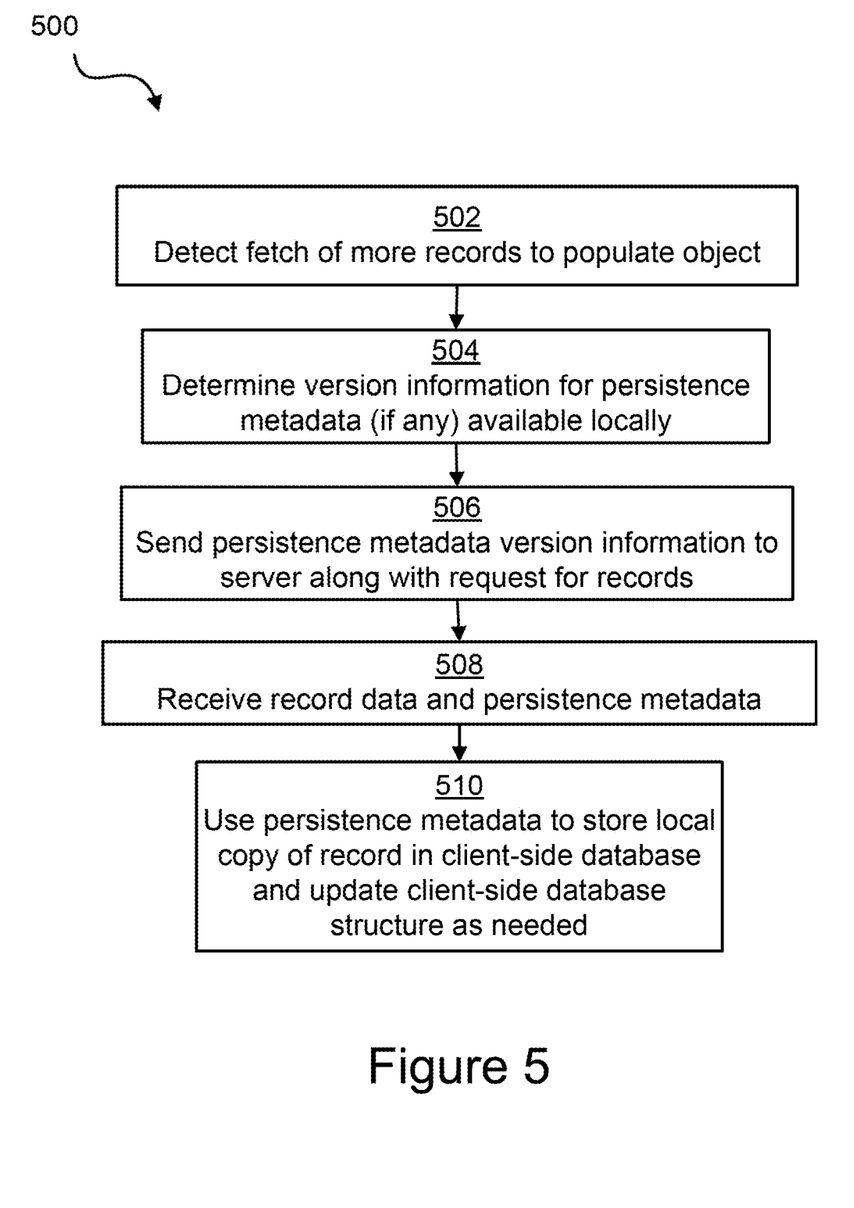
FIG. 5 is a flowchart showing steps in an exemplary client-side method for obtaining and using persistence metadata.

FIG. 5 is a flowchart showing steps in an exemplary client-side method 500 for obtaining and using persistence metadata based on version information. As was noted above, the server may support version tracking and/or comparison of persistence metadata to determine if a client is up-to-date. Block 502 represents detecting a desired fetch of one or more records to populate a client-side object. For example, program flow in the client application may move to a point at which a data provider calls the server, such as when object data is needed to populate fields in an interface element.

Block 504 represents determining version information for locally-available persistence metadata pertaining to the desired object data. This may comprise determining if any persistence metadata at all is available locally and, if so, a version number, date/time, or other indicator that can be submitted in a request to the server. As an example, the persistence framework may be configured to maintain version tracking information alongside data correlating persistence metadata to particular classes or other logical units.

Block 506 represents sending persistence metadata version information from the client to a server. In this example, a version number is sent along with the request for the object data. However, other embodiments may send the persistence metadata request separately from a data request and/or may send data other than a version number. For example, a date at which the locally-available persistence metadata was obtained may be sent or the locally-available persistence metadata itself may be sent for comparison by the server. If no persistence metadata is locally available, then a suitable indicator can be sent to the server (e.g., version=0, version=NULL, etc.).

Block 508 represents receiving record data and current persistence metadata at the client. For example, the persistence metadata may arrive as an XML file or other package recognized by the client-side metadata handling components. The persistence metadata can then be stored along with data cross-referencing the persistence metadata to the class or other logical unit to which it pertains. If received alongside record data, the record data can be stored in memory as one or more software objects or other components for use by the client application and the client-side persistence framework.

Additional embodiments can apply the client-side runtime behaviors noted above to an integrated development environment (IDE) or other coding application used to develop a client application. For example, an IDE such as Adobe(R) Flash(R) Builder(TM) may include a code editing interface and one or more wizards used to define data providers. As an example, a wizard may present a workflow using one or more dialog boxes for allowing a user to specify a data provider and generate code that, when compiled, results in a client application that calls the data provider, receives data (e.g., an XML object), and then associates the received object with one or more client-side objects or other logical units.

The IDE can be configured to determine if the data provider uses a server-side persistence framework and, if so, query, the data provider for persistence metadata. The persistence metadata can then be displayed to the developer and/or inserted into the code at appropriate locations to work with other elements of the application under development so that, when compiled/interpreted, the application invokes a client-side persistence framework and uses the persistence metadata.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising
   detecting, by a client application executed using a processor, a request for object data to a remote data provider;
   determining, by the client application, that persistence metadata related to the object data is locally available, wherein the persistence metadata describes how the object data is stored using one or more database structures; determining, by the client application, version information of the persistence metadata;
   transmitting, by the client application processor, the request for the object data to a remote data provider, wherein the request comprises the version information of the persistence metadata related to the object data;
   receiving, by the client application, the object data from the remote data provider in response to the request for the object data;
   receiving updated persistence metadata associated with the object from the data source in response to the request for the object data identifying that the version information is outdated; and
   storing the object data in a local database using the updated persistence metadata, wherein using the updated persistence metadata comprises storing the object data in an updated storage scheme described by updated persistence metadata that is different than an outdated storage scheme described by the persistence metadata.

2. The method set forth in claim 1,
   wherein maintaining the object data in memory comprises storing an object in volatile memory, and
   wherein storing the object data in the local database comprises storing data in nonvolatile memory.

3. The method of claim 2, wherein the locally-available persistence metadata is accessible via a bus to a tangible computer-readable medium and wherein transmitting the request for the object data to the remote data provider comprises transmitting the request via a network connection to the remote data provider.

4. The method set forth in claim 1, further comprising:
   updating the local database structure based on whether the updated persistence metadata is received.

5. The method set forth in claim 1, wherein the persistence metadata comprises at least one of:
   data mapping object parameters to database columns, wherein the updated persistence data changes the data mapping of object parameters to database columns,
   data identifying a relationship between the object and another object, wherein the updated persistence data changes the relationship between the object and the other object,
   data identifying join columns for the database, wherein the updated persistence data changes the join columns for the database, a loading parameter for use in loading data from the database, wherein the updated persistence data changes the loading parameter, or a cascading option, wherein the updated persistence data changes the cascading option.

6. The method set forth in claim 1,
wherein storing the object data in the local database comprises storing a plurality of parameter values of the object in corresponding columns of a table in the database.

7. The method set forth in claim 6,
wherein the object is an instance of a class, and
wherein each row of the table corresponds to an object that is an instance of the class.

8. The method set forth in claim 6,
wherein the object is an instance of the class and the object data comprises a plurality of records, and
wherein each row of the table corresponds to one of the plurality of records.

9. The method of claim 1, wherein the locally-available persistence metadata is stored at the same computing system at which the processor executes.

10. A computing system comprising a processor with access to a tangible computer readable medium embodying program components, the program components comprising:
an application that configures the computing system to request data representing an object from a data provider and store the data representing the object in memory, the object comprising an instance of an class, wherein the class defines a property and the object is represented in memory by a value for the property;
a persistence framework that configures the computing system to utilize persistence metadata to maintain a local database, the local database including an entry corresponding to the object, and the persistence metadata is related to the data representing the object, wherein the persistence metadata describes how the object data is stored using one or more database structures;
a metadata exchange module that configures the computing system to:
obtain updated persistence metadata from the data provider, wherein the metadata exchange module further configures the computing system to detect the request for data representing the object and obtain the updated persistence metadata from the data provider based on a locally available persistence metadata is outdated; and
update the local database if the persistence metadata available from the data provider represents an updated version of the persistence metadata, wherein updating the local database comprise storing the object in an updated storage scheme described by updated persistence metadata that is different than an outdated storage scheme described by the persistence metadata that is outdated.

11. The system set forth in claim 10, wherein the local database is maintained in a nonvolatile computer-readable medium.

12. The system set forth in claim 10, wherein the object is represented in memory as a set of parameter values and the entry for the object in the local database comprises a value in a column of a database table, each column of the database table corresponding to a respective property and each row of the database table corresponding to an instance of the class.

13. The system set forth in claim 10, wherein the metadata exchange module configures the computing system to obtain the persistence metadata when obtaining data representing the object.

14. A computer program product comprising a non-transitory computer-readable medium embodying program code executable by a computing system, the program code comprising:
program code for detecting a request for object data;
program code for determining that persistence metadata related to the object data is locally available, wherein the persistence metadata describes how the object data is stored using one or more database structures;
program code for determining version information of persistence metadata related to the object data;
program code for transmitting the request for the object data to a remote data provider, wherein the request comprises the version information;
program code for receiving object data from the remote data provider in response to the request for the object data;
program code for receiving updated persistence metadata associated with the object from the data source in response to the request for the object data identifying that the version information is outdated; and
program code for storing the object data in a local database using the updated persistence metadata, wherein using the updated persistence metadata comprises storing the object data in an updated storage scheme described by updated persistence metadata that is different than an outdated storage scheme described by the persistence metadata.

15. The computer program product set forth in claim 14,
wherein the program code for maintaining the object data in memory comprises code for storing an object in volatile memory, and
wherein the program code for storing the object data in the local database comprises program code for storing data in nonvolatile memory.

16. The computer program product set forth in claim 14, further comprising:
program code for updating the local database structure based on whether the updated persistence metadata is received.

17. The computer program product set forth in claim 14, wherein the persistence metadata comprises at least one of:
data mapping object parameters to database columns,
data identifying a relationship between the object and another object,
data identifying join columns for the database,
a loading parameter for use in loading data from the database, or
a cascading option.

18. The computer program product set forth in claim 14,
wherein storing the object data in the local database comprises storing a plurality of parameter values of the object in corresponding columns of a table in the database.

* * * * *